UNITED STATES PATENT OFFICE.

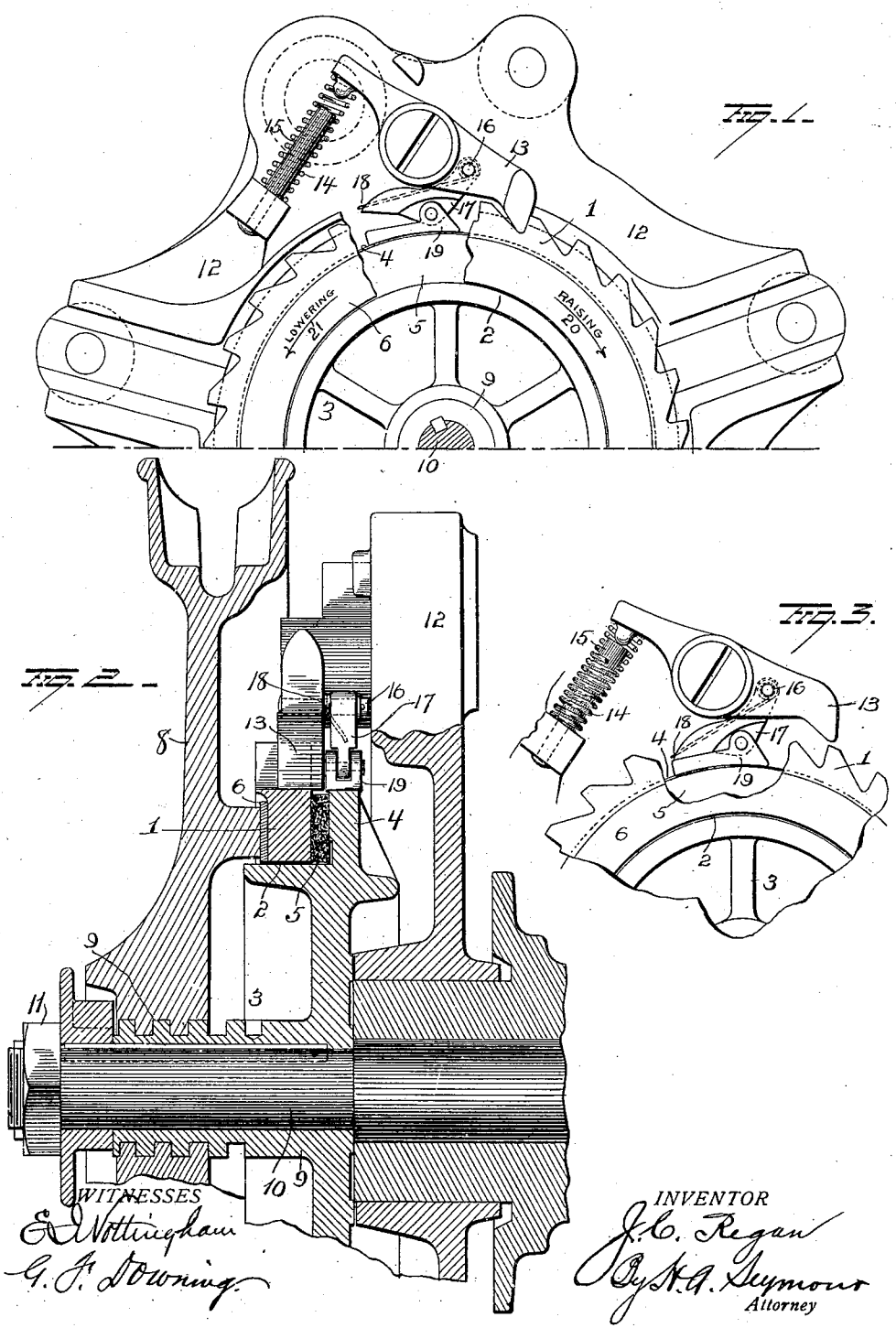

JOSEPH CHARLES REGAN, OF STAMFORD, CONNECTICUT, ASSIGNOR TO THE YALE & TOWNE MANUFACTURING COMPANY, OF STAMFORD, CONNECTICUT.

PAWL-AND-RATCHET MECHANISM.

No. 917,965.     Specification of Letters Patent.     Patented April 13, 1909.

Application filed May 16, 1908. Serial No. 433,239.

*To all whom it may concern:*

Be it known that I, JOSEPH CHARLES REGAN, of Stamford, in the county of Fairfield and State of Connecticut, have invented certain new and useful Improvements in Pawl - and - Ratchet Mechanism; and I do hereby declare the following to be a full, clear, and exact description of the invention, such as will enable others skilled in the art to which it appertains to make and use the same.

My invention relates to an improvement in pawl and ratchet mechanism, the object of the invention being to provide positively acting means for holding the pawl above the teeth of the ratchet during hoisting movement, and for lowering the head of the pawl onto the ratchet at the commencement of the reverse or lowering movement, thus avoiding altogether, the noise incidental to the contact of the teeth of the pawl against the ratchet during the hoisting movement and lessening the wear on said parts.

With these ends in view my invention consists in the parts and combinations of parts as will be more fully explained and pointed out in the claims.

In the accompanying drawings Figure 1 is a view of a section of a hoist showing my improvement applied thereto. Fig. 2 is a view partly in section and partly in end elevation of same, and also showing the chain wheel and Fig. 3 is a view partly in section showing the pawl elevated by the shoe.

The improvement is designed for use with mechanism employing a drum or pulley and pawl and ratchet, the latter rotating with the drum or pulley in hoisting, and held against rotation when the drum or pulley is rotating in a direction to lower the load, and while I have shown my improvement in connection with some of the features of a chain block, I do not limit its application to such apparatus.

1 represents a ratchet or toothed ring loosely mounted on the periphery 2 of the friction clutch or wheel 3. This wheel 3 is provided with a peripheral flange 4, having a smooth periphery, and is separated from the ratchet ring 1, by the friction ring 5, which latter rests on the periphery of wheel 3 and against the flange 4 thereof.

Secured to the outer face of the ratchet ring 1, is the smooth hard metal ring shaped bearing plate 6, against which the annular shoulder 7 formed on the hand chain wheel 8 bears. The hub of this chain wheel 8, is provided with internal threads which mesh with external threads on the hub 9 of clutch wheel 3 keyed to shaft 10, which latter is connected in any suitable manner, with the gearing of the chain block or other hoisting mechanism. The chain wheel 8 which is prevented from endwise displacement on shaft 10 by the nut 11, carries the hand chain by which the wheel is rotated, and which actuates the hoisting gearing. It is evident however that in a power machine, this wheel 8 would be supplanted by a wheel or other part driven by the motor.

The threads on the hub 9 of clutch wheel 3, are so constructed that a rotation of the hand wheel 8 in a direction to hoist the load, causes the wheel 8 to rotate on the threaded hub 9 of the clutch wheel 3 and move toward the latter. This inward movement of the chain wheel 8 on the screw, causes its shoulder 7 to bear with increasing pressure against the ring shaped plate 6 carried by the ratchet ring 1, and force the latter against the friction wheel or clutch 3 thus locking the parts together, and as the friction wheel or clutch is keyed to shaft 10, the latter will then be rotated in a direction to hoist the load.

Pivotally mounted on a pin carried by the frame 12 or other non-rotating portion of the device, is the pawl 13, the head of which is adapted to engage the teeth of the ratchet ring 1 as shown in Fig. 1, the rear end of the pawl being engaged by a spring 14 carried by the post 15. The spring normally tends to hold the head of the pawl in contact with the teeth of the ratchet ring, while the post 15, forms a stop against which the tail of the pawl strikes, to limit the elevation of the head of the pawl.

Pivotally mounted on the pin 16 projecting laterally from the pawl 13, in advance of the axis of the latter, is the arm 17, which is yieldingly depressed by the spring 18, secured to pin 16, and bearing against the upper surface of the arm. This arm 17 projects rearwardly or away from the head of the pawl, and is provided at its lower end with the shoe 19, which loosely rests on the periphery of flange 4 of the friction wheel 3, in rear of the pivotal connection of arm 17 to pawl 13.

As the friction wheel 3 rotates in the direction of arrow 20, or in the direction for hoisting, the head of the pawl riding on the tooth of the ratchet ring 1, will be elevated thus elevating the arm 17 and dragging the shoe 19 in the direction of movement of the friction or clutch wheel 3. During this movement, the friction of the shoe 19 on the periphery of the flange 4, also tends to move the shoe in that direction, and holds it from movement in the reverse direction during the hoisting movement, hence after the tooth of the ratchet ring has elevated the head of the pawl above the teeth, the shoe 19 and its arm 17 hold the pawl 13, out of contact with the teeth or ratchet ring 1, thus permitting the latter to continue its movement without contacting with the head of the pawl, and thereby eliminating the disagreeable clicking noise incidental to all machines wherein the ratchet moves in contact with the head of the pawl, and also lessening the wear of these parts.

So long as the chain wheel 8 is held in contact with the ratchet ring 1, there can be no reversal in the direction of rotation of the friction or clutch wheel 2. By reversing the direction of rotation of the chain wheel 8, as in lowering the load, as indicated by the arrow 21, the chain wheel, by reason of the screw threaded engagement with the hub of the friction or clutch wheel 3, will be moved away from the latter thus permitting the weight of the load to rotate the wheel 3, and the shaft 10 coupled thereto. This rotation of the shaft and the wheel in the reverse or lowering direction, causes the shoe 19 to move in the same direction, thereby lowering the head of the pawl into engagement with the ratchet and holding the latter against movement with the wheel 3. Assuming now that the chain wheel 8 is at rest, that is, not being rotated by the hand chain, the lowering movement of the wheel 3 and its shaft 10, due to the weight of the load, will, by reason of the screw threads on the latter, shift the chain wheel 8 laterally toward the ratchet ring 1 now held against rotation by the pawl, and force the latter against the friction block thus bringing the wheel 2 to rest.

The lowering movement is accomplished by turning the chain wheel 8 in the direction to lower. As the wheel is turned it will be moved laterally on the screw hub 9, away from the clutch wheel 3, thus releasing the latter from the ratchet ring 1. This permits the wheel 3 to turn in the lowering direction, but not any faster than the chain wheel is turned, hence any tendency to racing of the load is instantly checked.

In the event there is no load on the hoisting chain sufficiently heavy to turn the shaft 10 and wheel 3, the chain wheel when turned by the chain will move on the screw until its movement is checked by the nut or other device on the end of the screw. When it reaches the end of its lateral movement, its rotation will then rotate the wheel 3 and shaft 10 in a direction to lower.

It is evident that many slight changes might be resorted to in the relative arrangement of parts shown and described without departing from the spirit and scope of my invention hence I would have it understood that I do not wish to confine myself to the exact construction and arrangement of parts shown and described, but, Having fully described my invention what I claim as new and desire to secure by Letters-Patent, is:—

1. In a pawl and ratchet mechanism, the combination with a ratchet and a pawl adapted to engage the teeth of the ratchet, of a smooth cylindrical bearing surface adjacent to and coextensive with the ratchet, an arm pivoted to the pawl intermediate the axis and head of the latter and a shoe pivotally connected to said arm and resting on said smooth bearing surface, and operating to hold the head of the pawl out of the path of the teeth of the ratchet when the latter and smooth bearing surfaces are rotating in one direction and to lower the pawl onto the ratchet when the bearing surface is rotated in the opposite direction.

2. In a pawl and ratchet mechanism, the combination with a ratchet and a pawl pivoted to a part fixed with relation to the ratchet, and adapted to engage the teeth of said ratchet, of a smooth bearing surface concentric and coextensive with the ratchet, an arm pivoted to said pawl intermediate the axis and head of the latter and a shoe loosely connected to said pivoted arm and resting on the smooth bearing surface.

3. In a pawl and ratchet mechanism, the combination with a clutch consisting of a wheel having a flange and a ratchet ring mounted on the wheel adjacent to the flange, of means for forcing the ring toward the flange, a pawl pivoted to a fixed part and adapted to engage the teeth of the ratchet ring, an arm pivoted to the pawl intermediate the head and axis of the said pawl, and a shoe resting on the periphery of the flange of the wheel and pivotally connected with the lower end of said arm.

4. In a pawl and ratchet mechanism, the combination with a clutch consisting of a wheel and a ratchet, and means for forcing and holding the ratchet into contact with the wheel, of a pawl pivoted to a fixed part and adapted to engage the teeth of the ratchet, an arm pivotally connected with the pawl intermediate the head and axis of said pawl, a shoe loosely carried by said arm, and resting on the periphery of said wheel, and a spring for yieldingly holding the shoe in contact with the wheel.

In testimony whereof, I have signed this specification in the presence of two subscribing witnesses.

JOSEPH CHARLES REGAN.

Witnesses:
SCHUYLER MERRITT,
WILLIAM H. BERLIN.